United States Patent
Carmona et al.

(10) Patent No.: US 9,476,708 B2
(45) Date of Patent: Oct. 25, 2016

(54) ACCELEROMETER BASED ATTITUDE DETERMINATION

(71) Applicant: COMMISSARIAT A L/ENERGIE ATOMIQUE ET AUX ENERGIES ALTERNATIVES, Paris (FR)

(72) Inventors: Mikael Carmona, Tencin (FR); Laurent Jouanet, Autrans (FR); Nathalie Sprynski, Saint Pierre d'Allevard (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 377 days.

(21) Appl. No.: 14/108,930

(22) Filed: Dec. 17, 2013

(65) Prior Publication Data

US 2014/0180633 A1  Jun. 26, 2014

(30) Foreign Application Priority Data

Dec. 19, 2012 (FR) ...................... 12 62322

(51) Int. Cl.
| | | |
|---|---|---|
| G01C 9/00 | (2006.01) | |
| G01C 9/02 | (2006.01) | |
| E04G 21/22 | (2006.01) | |
| G01C 9/06 | (2006.01) | |
| G01C 21/10 | (2006.01) | |
| G06F 3/046 | (2006.01) | |
| G06F 3/0346 | (2013.01) | |

(52) U.S. Cl.
CPC ................ G01C 9/02 (2013.01); E04G 21/22 (2013.01); G01C 9/06 (2013.01); G01C 21/10 (2013.01); G06F 3/0346 (2013.01); G06F 3/046 (2013.01)

(58) Field of Classification Search
CPC ............ G01C 9/00; G01C 9/06; G01C 9/02; G01P 15/18; G06F 3/046; G06F 3/0346
USPC ................. 702/127, 150, 151, 154
See application file for complete search history.

(56) References Cited

U.S. PATENT DOCUMENTS 7,529,640 B2* 5/2009 Fujiwara ............. G01C 9/00
                                                                    702/127
9,188,422 B2* 11/2015 David ................. G01B 7/287

FOREIGN PATENT DOCUMENTS

| EP | 1115350 | 8/2003 |
| EP | 1985233 | 10/2008 |
| EP | 2077432 | 7/2009 |
| WO | WO2007/062496 | 6/2007 |

OTHER PUBLICATIONS

Parsa et al. "Attitude Calibration of an Accelerometer Array"; Proceedings of the 2002 IEEE International Conference on Robotics & Automation, May 2002 pp. 129-134.

* cited by examiner

*Primary Examiner* — An Do
(74) *Attorney, Agent, or Firm* — Occhiuti & Rohlicek LLP

(57) ABSTRACT

Determining an object's inclination fixed reference frame relative to a gravity field includes supplying circularly disposed accelerometers rigidly linked by the object and measuring in non-collinear directions. A radius linking it to the circle's center defines an accelerometer's measurement direction. The accelerometers measure components of the field along the measurement directions to provide measurement values. Then, a matrix equation is solved to obtain the object's inclination relative to the reference frame.

7 Claims, 1 Drawing Sheet

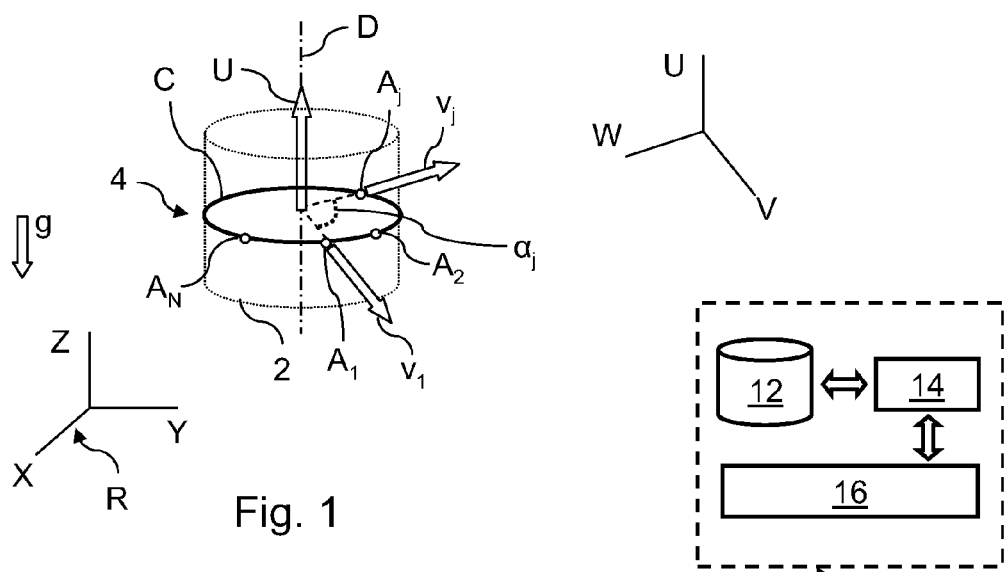
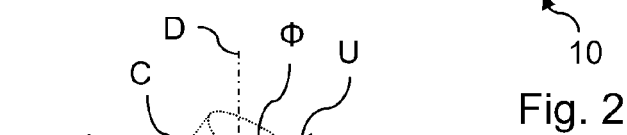
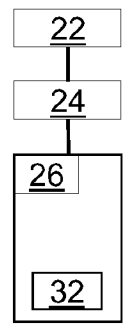
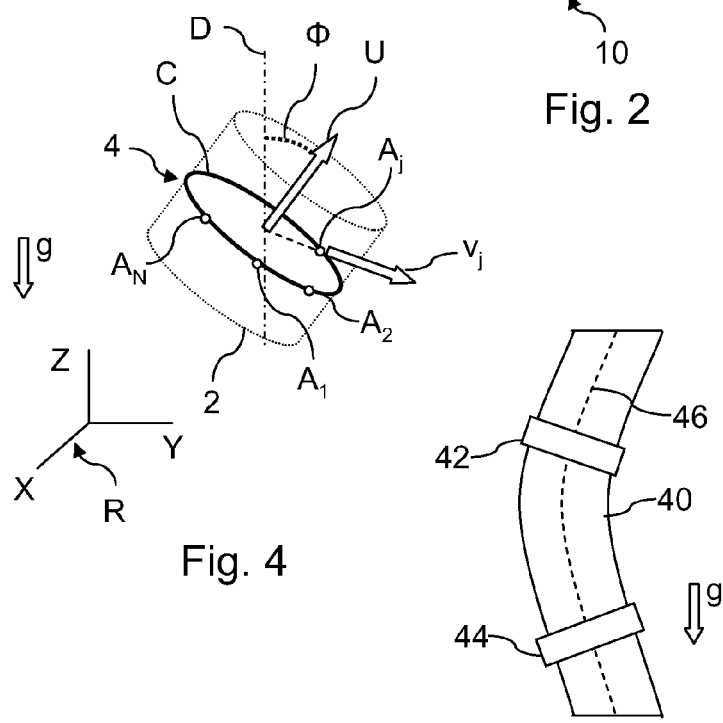
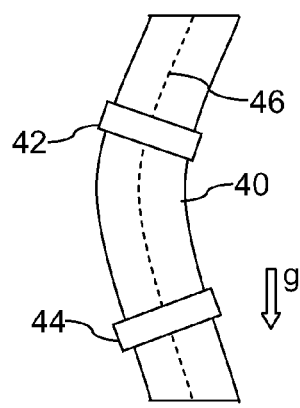

ACCELEROMETER BASED ATTITUDE DETERMINATION

RELATED APPLICATIONS

This application claims the benefit of the Dec. 19, 2012 priority date of French application FR 1262322, the contents of which are herein incorporated by reference.

FIELD OF INVENTION

The invention relates to a methods and devices for determining the inclination of an object, and to the use of such a device.

BACKGROUND

It is known practice to determine the inclination of an object using motion sensors placed on this object. Inclination should be understood to mean the angle formed by an axis of the object relative to the direction of the field of gravity. These sensors are generally of different kinds such as accelerometers, magnetometers and gyroscopes.

In some applications, the simultaneous use of these sensors of different kinds is not desirable. For example, a gyroscope does not supply sufficient information when the object exhibits a motion of small amplitude. Also, a magnetometer exhibits a great sensitivity to the environment and adds an additional source of noise. Furthermore, the processing of data originating simultaneously from sensors of different kinds is more complex to implement than when there is only one type of sensor.

Methods are thus known for determining the inclination of an object equipped with accelerometers but not equipped with magnetometers and gyroscopes. Such a method is described in the article by K. Parsa et al., "Attitude calibration of an accelerometer array," Proceedings of the 2002 IEEE International Conference on Robotics & Automation," p. 129-134, May 2002. This method does, however, require the knowledge of the absolute position of the accelerometers relative to a frame of reference. This can be a drawback in those applications in which the absolute position of the object in the frame of reference is not known.

SUMMARY

A need exists for a robust and reliable method for determining the inclination of an object relative to a vertical direction using an array of accelerometers placed on this object when the absolute position of the accelerometers on this object is not known.

The invention relates to a method for determining the inclination of an object in a fixed frame of reference relative to the direction of the Earth's gravity field. Such a method includes the supply of a plurality of accelerometers rigidly linked by the object and distributed over a circle, each of these accelerometers being suitable for measuring an acceleration in at least one measurement direction, the respective measurement directions of at least two of the accelerometers being non-colinear, at least one of the measurement directions of each of the accelerometers being defined by the radius linking this accelerometer to the center of the circle; the measurement, by the accelerometers, of the components of the Earth's gravity field along the measurement directions, this measurement providing, for each of the directions, a measurement value, denoted $m_j$ for a measurement direction of index i; the resolution of the following matrix equation to determine the inclination $\Phi$ of the object relative to the frame of reference:

$$M = A \begin{bmatrix} \cos(\phi) \\ -\sin(\phi)\sin(\eta) \\ -\sin(\phi)\cos(\eta) \end{bmatrix}$$

with M being the vector whose $i^{th}$ component is defined by the measurement $m_j$, A being a matrix defined by the measurement directions of the accelerometers in a frame of reference attached to the object, and $\eta$ being an angle of rotation of this attached frame of reference relative to the fixed frame of reference, the accelerometers exhibiting a Gaussian and centered measurement statistical noise, the resolution comprising the minimization of a criterion $L(\Phi, \eta)$ defined by the following equation:

$$L(\Phi,\eta) = (\sin(\phi)\underline{f}(\eta) - M)^T \times \underline{\Gamma}^{-1} \times (\sin(\phi)\underline{f}(\eta) - M)$$

with $\underline{f}(\eta)$ being a vector whose $i^{th}$ component is equal to $-\sin(\alpha_i + \eta)$, with $\alpha_i$ being the positioning angle, about an axis normal to the circle and passing through its center, of the accelerometer of index i relative to one of the accelerometers taken as a reference, and with $\underline{\Gamma}$ being a covariance matrix corresponding to the measurement statistical noises of the accelerometers for the measurement directions.

According to a variant, the accelerometers number at least three and are distributed uniformly over the circle.

According to another variant, the accelerometers number at least four.

According to yet another variant, the statistical noises of the accelerometers are statistically independent, and the covariance matrix $\underline{\Gamma}$ is a diagonal matrix and defined positive whose $i^{th}$ coefficient is equal to the variance $\sigma_i^2$ for the $i^{th}$ measurement direction.

According to another variant, the measurement steps are performed on an object exhibiting a specific acceleration relative to the frame of reference at least ten times less than the amplitude of the gravity field g, preferably at least twenty times less than the amplitude of the gravity field g.

According to yet another variant, the method relates to the calculation of the curvature of a structure and comprises: the supply of first accelerometers linked by a first rigid object; the supply of second accelerometers linked by a second rigid object fixed to a second place of the structure; the determination of the respective inclinations of the first and second objects by a method as described above; and the calculation of the curvature of the structure from the determined first and second inclinations.

The invention also relates to an instrumented object comprising a device for automatically determining the inclination of this object in a fixed frame of reference relative to the direction of the Earth's gravity field. Such a device comprises a plurality of accelerometers linked rigidly by the object and distributed over a circle, each of these accelerometers being suitable for measuring a component of the Earth's gravity field in at least one measurement direction to supply a measurement value denoted $m_j$ for a measurement direction of index i, the respective measurement directions of at least two of the accelerometers being non-colinear, at least one of the measurement directions of each of the accelerometers being defined by the radius linking this accelerometer to the center of the circle; and a programmed computation device for determining the inclination $\Phi$ of the object relative to the frame of reference:

$$M = A \begin{bmatrix} \cos(\phi) \\ -\sin(\phi)\sin(\eta) \\ -\sin(\phi)\cos(\eta) \end{bmatrix}$$

with M being the vector whose $i^{th}$ component is defined by the measurement $m_j$, A being a matrix defined by the measurement directions of the accelerometers in a frame of reference attached to the object, and η being an angle of rotation of this attached frame of reference relative to the fixed frame of reference, the accelerometers exhibiting a Gaussian and centered measurement statistical noise, the computation device being programmed to resolve the matrix equation by the minimization of a criterion L(Φ, η) defined by the following equation:

$$L(\Phi,\eta) = (\sin(\phi)\underline{f}(\eta)-M)^T \times \underline{\Gamma}^{-1} \times (\sin(\phi)\underline{f}(\eta)-M)$$

with $\underline{f}(\eta)$ being a vector whose $i^{th}$ component is equal to $-\sin(\alpha_i+\eta)$, with $\alpha_i$ being the positioning angle, about an axis normal to the circle and passing through its center, of the accelerometer of index i relative to one of the accelerometers taken as a reference, and with Γ being a covariance matrix corresponding to the measurement statistical noises of the accelerometers for the measurement directions.

BRIEF DESCRIPTION OF THE FIGURES

Other features and advantages of the invention will clearly emerge from the description given below, as a nonlimiting indication, and with reference to the appended drawings, in which:

FIG. 1 schematically illustrates an object comprising a device for measuring the inclination of this object, the object exhibiting a zero inclination relative to a vertical direction;

FIG. 2 schematically illustrates a device for computing the inclination of the object of FIG. 1;

FIG. 3 is a flow diagram of a method for using the device of FIG. 1;

FIG. 4 schematically illustrates the object of FIG. 1 in an inclined position relative to the vertical direction; and FIG. 5 schematically illustrates, in a profile view, a portion of a structure comprising the object of FIG. 1.

DETAILED DESCRIPTION

FIG. 1 represents an instrumented object 2, comprising a device 4 configured to determine the inclination of the object 2 relative to a reference direction D. The reference direction D is the direction in which the gravitational force on the object 2 is directed. For example, if the object 2 is subject to the Earth's gravity, the reference direction D is the direction of the Earth's gravitational field, represented by the vector g and defining a vertical direction.

The object 2 is, in the example, a solid considered to be non-deformable. This means that the distance separating any points of the object 2 does not vary when this object 2 undergoes a movement. This object 2 is here of cylindrical form. Here, an orthonormal frame of reference is defined by the vectors U, V, W and attached to the object 2, U being the vector in the direction of the axis of the cylinder. In a general case, an orthonormal frame of reference can be associated arbitrarily with an object that is not necessarily cylindrical.

To simplify, the object 2 is drawn in broken lines in FIG. 1 (and in FIG. 4). The object 2 can, for example, be produced in the form of a collar intended to be fixed to another object.

In this description, to characterize the inclination of the object 2, an orthonormal frame of reference R is defined, called "frame of reference." This frame of reference R is made up of three orthonormal directions X, Y and Z. The vertical direction, denoted Z, is parallel to the direction D of the gravitational field g in the example. The direction of the gravitational field g will be expressed by the vector [0; 0; 1] in the frame of reference R. The inclination of the object 2 is defined as being the angle formed between the direction D and the axis U along which the object 2 extends. In FIG. 1, the object 2 is illustrated with a zero inclination. The directions D and U are therefore parallel.

A general case of implementation of the invention will be studied first.

The unitary vectors of the orthonormal frame of reference attached to the object 2 can be defined as follows in the frame of reference R:

$$U = \begin{bmatrix} \sin(\phi)\cos(\theta) \\ \sin(\phi)\sin(\theta) \\ \cos(\phi) \end{bmatrix}$$

$$V = \begin{bmatrix} \cos(\eta)\sin(\theta) + \sin(\eta)\cos(\phi)\cos(\theta) \\ -\cos(\eta)\cos(\theta) + \sin(\eta)\cos(\phi)\sin(\theta) \\ -\sin(\phi)\sin(\eta) \end{bmatrix}$$

$$W = U \wedge V$$

with Φ being the inclination of the object 2 relative to the direction D, θ being the azimuth of U, and η being an angle of rotation of the frame of reference attached to the object 2 relative to the frame of reference R, ˆ being the vector cross-product operator.

The device 4 is therefore configured to determine the inclination Φ of the object 2 relative to the direction D. The variable η is an intermediate parameter, used in formalizing the problem. The device 4 comprises at least two accelerometers. This device 4 does not, however, use a magnetometer or a gyrometer to determine this inclination. Each of these accelerometers is configured to measure an acceleration in at least one measurement direction. These accelerometers are: linked together by a rigid link and distributed over a circle; suitable for measuring the Earth's gravity field and not only the relative acceleration of the object 2; and placed in such a way that at least two accelerometers have respective measurement directions which are not mutually colinear.

Advantageously, the angle between these directions is at least equal to 30°, preferably at least equal to 45°, and even more preferentially at least 60°. The coordinates of the directions of measurement or sensitivity of the accelerometers are known in the frame of reference U, V, W. The accelerometers are distant to reduce the measurement estimation uncertainties.

In this example, the device 4 comprises N accelerometers $A_1$ to $A_N$, where N is an integer advantageously greater than or equal to three, four, or seven, or ten. These accelerometers are here mono-axial. This means that each accelerometer has only one measurement direction. The accelerometers $A_1$ to $A_N$ have an embedding link with the object 2. The object 2 forms a rigid link between the accelerometers $A_1$ to $A_N$.

The invention can also be implemented by including one or more accelerometers with two or three measurement directions among the accelerometers. Such accelerometers will be treated as a plurality of mono-axial accelerometers among the accelerometers $A_1$ to $A_N$ and each having a measurement direction. In this description, the $i^{th}$ accelerometer is designated by the reference $A_i$ where i is an integer greater than or equal to 1 and less than or equal to N. The measurement direction of this $i^{th}$ mono-axial accelerometer is denoted $v_i$. In the general case, reference will be made to this $i^{th}$ accelerometer to designate the general properties of the accelerometers.

To simplify, the placement of each of these accelerometers is embodied by a spot placement. To simplify, in FIGS. 1 and 4, only the accelerometers $A_1$, $A_2$, $A_j$ and $A_N$ are illustrated.

The acceleration measured by each of these accelerometers corresponds to the geometrical projection of the gravitational field g onto the measurement direction of this accelerometer.

The measurement direction $v_i$ of any one of the accelerometers $A_i$ is determined by the following equation, with coefficients $a_{i,1}$, $a_{i,2}$, and $a_{i,3}$ being coefficients known by assumption, and that are time-invariant because of the rigid link between the accelerometers $A_1$ to $A_N$.

$$v_i = a_{i,1}U + a_{i,2}V + a_{i,3}W$$

Each accelerometer thus performs a following measurement mi, corresponding to the projection of the gravity field onto its measurement direction:
Thus, $m_i = v_i^T g$, where "T" designates the transpose operator.

$$m_i = a_{i,1}(U^T g) + a_{i,2}(V^T g) + a_{i,3}(W^T g)$$

M defines the vector $[m_1, \ldots m_N]^T$ containing the different measurements of the accelerometers.

A matrix A is defined by:

$$A = \begin{bmatrix} a_{1,1} & a_{1,2} & a_{1,3} \\ a_{2,1} & a_{2,2} & a_{2,3} \\ \ldots & \ldots & \ldots \\ a_{N,1} & a_{N,2} & a_{N,3} \end{bmatrix}$$

By noting that $U^T g = \cos(\Phi)$, $V^T g = -\sin(\Phi)\sin(\eta)$ and $W^T g = -\sin(\Phi)\cos(\eta)$, the concatenation of the preceding equations can be produced in the following form:

$$M = A \begin{bmatrix} \cos(\phi) \\ -\sin(\phi)\sin(\eta) \\ -\sin(\phi)\cos(\eta) \end{bmatrix}$$

The angles $\Phi$ and $\eta$ can therefore be found when the matrix A (whose coefficients are known) is at least of rank 2, which is when at least two measurement directions are non-colinear.

The resolution of this matrix equation can be done by minimizing the following criterion:

$$L(\phi, \eta) = \left\| M - A \begin{bmatrix} \cos(\phi) \\ -\sin(\phi)\sin(\eta) \\ -\sin(\phi)\cos(\eta) \end{bmatrix} \right\|^2$$

$\|.\|$ defining the Euclidean norm of three-dimensional vectors. This resolution remains valid even when the matrix equation of M is disrupted by amplitude uncertainties at least ten times less than the amplitude of the gravity field g.

The minimization of this criterion L makes it possible to maximize the likelihood function of the system. The resolution provides values $\Phi_0$ and $\eta_0$ that minimize the criterion L. Minimization algorithms are known to those skilled in the art.

Such a method for determining the inclination thus makes it possible to obtain good accuracy when two measurement directions are used, and without a magnetometer. Such an inclination is obtained relative to the axis U in any plane that includes the axis U. Furthermore, such a method makes it possible to obtain good accuracy in determining the inclination, from low inclination values, which proves of interest to applications where the inclination varies within a relatively limited range.

A specific implementation of the invention is illustrated with reference to FIG. 1. This implementation has proven particularly advantageous.

Referring to FIG. 1, the accelerometers are here positioned on a circle C, passing through each of the accelerometers such that the measurement directions of the accelerometers are contained in the plane including this circle. Also, the normal to the plane including the circle C coincides with the direction defined by the vector U. A suitable acceleromter is that marketed by the company "Colibrys" under the trade reference "MS9002."

The measurement direction of the accelerometer $A_1$ is chosen to be colinear to the axis V for this example. Here, the measurement direction $v_i$ of the $i^{th}$ accelerometer extends radially from the center of the circle C. This direction $v_i$ is here represented by a vector, whose direction is along a straight line passing through the spot placement of the $i^{th}$ accelerometer and through the center of the circle C.

The measurement direction $v_i$ is expressed:

$$v_i = \cos(\alpha_i)V + \sin(\alpha_i)W$$

with $\alpha_i$ being the known positioning angle of the accelerometer $A_i$ relative to a reference accelerometer ($A_1$ in this example) about the axis U.

In this example, the matrix A is then expressed:

$$A = \begin{bmatrix} 0 & \cos(\alpha_1) & \cos(\alpha_1) \\ 0 & \cos(\alpha_2) & \sin(\alpha_2) \\ \ldots & \ldots & \ldots \\ 0 & \cos(\alpha_N) & \sin(\alpha_N) \end{bmatrix}$$

The measurement vector M is then expressed with the following theoretical expression:

$$M = -\sin(\phi) \begin{bmatrix} \sin(\alpha_1 + \eta) \\ \sin(\alpha_2 + \eta) \\ \ldots \\ \sin(\alpha_N + \eta) \end{bmatrix}$$

The resolution of this matrix equation can carried out by minimizing the following criterion:

$$L(\phi, \eta) = \left\| M + \sin(\phi) \begin{bmatrix} \sin(\alpha_1 + \eta) \\ \sin(\alpha_2 + \eta) \\ \ldots \\ \sin(\alpha_N + \eta) \end{bmatrix} \right\|^2$$

Here, the measurement signal mi is affected by a statistical noise for each of the accelerometers. The measurement signal is therefore broken down into two terms and is of the following form: $M = \sin(\Phi) \cdot f(\eta) + b$, with b being a vector representative of the measurement error due to the respective statistical noises $b_i$ of the sensors $A_i$, $\underline{f}(\eta)$ being a vector whose $i^{th}$ component is equal to $-\sin(\alpha_i + \eta)$.

In this example, each statistical noise is a Gaussian and centered statistical process, which corresponds to a good approximation of the reality for a large number of accelerometers. The variance of this statistical noise, for the $i^{th}$ accelerometer, is denoted $\sigma_i^2$. The covariance matrix $\underline{\Gamma}$ associated with this statistical process is defined.

The respective statistical noises of the N accelerometers are here statistically independent. Thus, in this example, this matrix $\underline{\Gamma}$ is a diagonal and positive defined matrix, whose $i^{th}$ diagonal coefficient is equal to the variance $\sigma_i^2$ of the $i^{th}$ accelerometer.

The resolution of the matrix equation can then be done by minimizing the following criterion:

$$L(\Phi, \eta) = (\sin(\phi)\underline{f}(\eta) - M)^T \times \underline{\Gamma}^{-1} \times (\sin(\phi)\underline{f}(\eta) - M)$$

Advantageously, to reduce the total error on the inclination of the object 2 originating from the statistical noise of the individual accelerometers, these accelerometers are placed on the circle C based on the variances of the accelerometers.

In particular, if the respective variances of the accelerometers satisfy the following optimailty condition:

$$\sigma_{max}^{-2} \leq \frac{1}{2} Tr(\underline{\Gamma}^{-1})$$

in which $\sigma_{max}^{-2}$ is the maximum inverse of the inverses $\sigma_j^{-2}$ of the variances of the accelerometers, "Tr" designates the trace mathematical operator and $\underline{\Gamma}$ is the covariance matrix, then the accelerometers are placed on the circle C in such a way as to satisfy the following relationships:

$$\sum_{j=1}^{N} \sigma_j^{-2} \sin(2\alpha_j) = 0$$

and $$\sum_{j=1}^{N} \sigma_j^{-2} \cos(2\alpha_j) = 0$$

On the other hand, if the respective variances of the accelerometers do not satisfy the optimality condition, then the accelerometer exhibiting the maximum inverse variance $\sigma_{max}^{-2}$ is placed at any position on the circle C and all the other accelerometers are placed, on the circle C, at an angle of 90° from this accelerometer.

The device 4 also comprises a computation device 10, configured to automatically compute the inclination of the object 2. FIG. 2 schematically represents this device 10. This device 10 comprises: an information storage medium 12, a programmable electronic computer 14, and a data exchange interface 16.

The computer 14 is notably programmed to execute software contained on tangible and non-transitory computer-readble medium 12. The medium 12 contains instructions for executing the method illustrated in FIG. 3. The interface 16 notably allows for the acquisition, by the computer 14, of the measurement values m(j) supplied by the accelerometers of the device 4. For example, the interface 16 can comprise a data bus, such as a serial peripheral interface bus, electrically linked to the accelerometers $A_1$ to $A_N$.

An example of use of the object 2 will now be described in detail, with reference to the flow diagram of FIG. 3 and using FIG. 4.

The information in the matrix A concerning the accelerometers is defined beforehand, as are the statistical noise properties of the accelerometers.

At an instant t, the object 2 is in an initial position with a given inclination. Then, in step 22, the object 2 undergoes a movement from its initial position to a position in which the object 2 exhibits a new inclination relative to the reference direction D. For example, the object 2 undergoes a rotation relative to the frame of reference R. At the end of this rotation, the object 2 exhibits an angle of inclination, denoted $\Phi$, that is non-zero, relative to the direction D, as seen in FIG. 4.

In step 24, the accelerations undergone by the accelerometers are measured. Each accelerometer supplies an acceleration measurement $m_i$.

During the measurement, the object 2 is in a quasi-static state, since the determination of the inclination uses a resolution based on the measurements of the gravity field g by the different accelerometers. It can be considered that the object is in a quasi-static state when the maximum specific acceleration corresponding to the motion of the object 2 relative to the frame of reference R is at least ten times or twenty times or fifty times less than the amplitude of gravitational field g. Thus, the measurement is suitable for an object 2 whose normal conditions of use are of quasi-static type.

In a step 26, the inclination of the object is determined automatically from the measurements $m_i$. During this step, an operation 32 includes the resolution of the equation of type $$M = A \begin{bmatrix} \cos(\phi) \\ -\sin(\phi)\sin(\eta) \\ -\sin(\phi)\cos(\eta) \end{bmatrix}$$

this resolution comprising the minimization of a criterion $L(\Phi, \eta)$ defined by the equation:

$$L(\Phi, \eta) = (\sin(\phi)\underline{f}(\eta) - M)^T \times \underline{\Gamma}^{-1} \times (\sin(\phi)\underline{f}(\eta) - M)$$

Numerous other embodiments are possible. For example, the object 2 can have a different form. The inclination of the object 2 can be defined other than relative to the axis U.

The accelerometers are not necessarily all mono-axial. For example, the accelerometers can also be tri-axial accelerometers, such as those marketed by the company "STMicroelectronics" under the trade reference "LSM303DLH.".

Steps of the method of FIG. 3 can be executed in a different order and/or can be simultaneous.

In the step 20, the object 2 is not necessarily placed in an initial state exhibiting a zero inclination, but can exhibit a non-zero inclination. The movement (step 22) of the object 2 and the measurement of the accelerations (step 24) can be concomitant, provided that the object 2 remains quasi-static during its movement.

At least two objects 2 can be combined to determine deformation properties of a deformable structure, such as the curvature.

FIG. 5 represents a portion of a deformable structure 40 on which are placed instrumented objects 42 and 44 that are, in one example, identical to the object 2. Deformation properties of the structure 40 can thus be indirectly computed from the inclination of each of the objects 42 and 44.

In this example, the structure 40 is deformable by bending. The objects 42 and 44 are securely attached to the structure 40 by an embedding link. These objects 42 and 44 are for example connected, by a data bus, to a computation unit configured to determine the curvature of a median direction 46 of the structure 40 from the inclinations measured by each of the objects 42 and 44. To simplify illustration, the data bus and the computation unit are not illustrated in FIG. 5. The inclination of these objects 42 and 44 is defined relative to the direction of the gravity field g, which in this case is vertical.

This computation unit is notably programmed to evaluate the inclination at any point of the structure 40, from the measurements supplied by the objects 42 and 44, for example, by means of interpolation methods such as cubic spline interpolation; and to compute, from the knowledge of this inclination at any point of the structure 40, the curvature k at any point of the direction 46 of the structure 40, for example by means of the following formula (assuming that the median direction of the structure is not left):

$$k(S) = \frac{d\phi(S)}{ds}$$

in which k(S) is the curvature of the direction 46 at the point S of curvilinear abscissa s (the origin of the curvilinear abscissa being set arbitrarily, and $\Phi(s)$ being the inclination of the structure 40 at the point S of curvilinear abscissa s.

These examples of interpolation and reconstruction methods are, for example, described in chapter 1 of the doctoral thesis by N. Sprynski, "Reconstruction of curves and surfaces from tangential data," Joseph Fourier University, Grenoble, France, 2007.

When a plurality of objects 42, 44 are used jointly on one and the same structure to determine properties of this structure 40, then the computation device 10 can take a different form. For example, this device 10 is not necessarily incorporated in each of the objects 42, 44. A single device 10 can then be placed outside these objects 42, 44, in a data processing unit configured to receive the measurement data from the accelerometers of the objects 42 and 44.

The method for determining inclination or curvature can be applied to a beam, for example in the construction domain. Such a method can, for example, be used to determine the evolution of the elasticity module of a beam over time as a function of the determined inclination or curvature. The method for determining inclination can also be applied to traction cables, for example bridge

The invention claimed is:

1. A method comprising determining an inclination of an object in a fixed frame of reference relative to a direction of the Earth's gravity field, wherein determining an inclination comprises supplying a plurality of first accelerometers rigidly linked by said object and distributed over a circle, wherein each of said accelerometers is suitable for measuring an acceleration in at least one measurement direction, wherein respective measurement directions of at least two of said accelerometers are non-collinear, wherein at least one of measurement direction of each of said accelerometers is defined by a radius linking said accelerometer to a center of said circle, measuring, by said accelerometers, of components of the Earth's gravity field along said measurement directions, said measurement providing, for each of said directions, a measurement value, $m_j$ for a measurement direction of index i, resolving the following matrix equation to determine an inclination $\Phi$ of said object relative to a frame of reference:

$$M = A \begin{bmatrix} \cos(\phi) \\ -\sin(\phi)\sin(\eta) \\ -\sin(\phi)\cos(\eta) \end{bmatrix}$$

wherein M is vector whose $i^{th}$ component is defined by the measurement $m_j$, wherein A is a matrix defined by measurement directions of said accelerometers in a frame of reference attached to said object, wherein $\eta$ is an angle of rotation of said attached frame of reference relative to said fixed frame of reference, wherein said accelerometers exhibit a Gaussian and centered measurement statistical noise, wherein resolving comprises minimizing a criterion $L(\Phi, \eta)$ defined by the following equation:

$$L(\Phi,\eta) = (\sin(\phi)\underline{f}(\eta) - M)^T \times \underline{\Gamma}^{-1} \times (\sin(\phi)\underline{f}(\eta) - M)$$

wherein $\underline{f}(\eta)$ is a vector whose $i^{th}$ component is equal to $-\sin(\alpha_i + \eta)$, wherein $\alpha_i$ is a positioning angle, about an axis normal to said circle and passing through said center, of an accelerometer of index i relative to an other of said accelerometers taken as a reference, and wherein $\underline{\Gamma}$ is a covariance matrix corresponding to measurement statistical noises of said accelerometers for said measurement directions;

wherein the method further comprises determining a curvature of a structure, which includes linking said first accelerometers with a first rigid object fixed to a first place on said structure, providing second accelerometers linked by a second rigid object fixed to a second place on said structure, wherein said step of determining an inclination is carried out twice, once to determine an inclination of said first rigid object using said first accelerometers, and once more to determine an inclination of said second rigid object using said second accelerometers, and calculating a curvature of said structure based at least in part on said inclination of said first rigid object and inclination of said second rigid object.

2. The method of claim 1, wherein supplying a plurality of accelerometers comprises supplying at least three accelerometers, and wherein said accelerometers are distributed uniformly around said circle.

3. The method of claim 2, wherein supplying a plurality of accelerometers comprises supplying at least four accelerometers.

4. The method of claim 1, wherein statistical noises of said accelerometers are statistically independent, wherein said covariance matrix is a positive diagonal and defined matrix whose $i^{th}$ coefficient is equal to a variance $\sigma_i^2$ for said $i^{th}$ measurement direction.

5. The method of claim 1, wherein measuring is performed on an object that exhibits a specific acceleration relative to said frame of reference, wherein said specific acceleration is at least ten times less than acceleration due to gravity.

6. The method of claim 1, wherein measuring is performed on an object that exhibits a specific acceleration relative to said frame of reference, wherein said specific acceleration is at least twenty times less than acceleration due to gravity.

7. An apparatus comprising an instrumented object, said instrumented object comprising a device for automatically determining inclination of said object in a fixed frame of reference relative to the direction of the Earth's gravity field, wherein said device comprises a plurality of accelerometers and a programmed computation device, wherein said accelerometers are linked rigidly by said object, wherein said accelerometers are distributed over a circle, wherein each of said accelerometers is suitable for measuring a component of the Earth's gravity field in at least one measurement direction to supply a measurement value denoted $m_j$ for a measurement direction of index i, the respective measurement directions of at least two of said accelerometers being non-collinear, at least one of the measurement directions of each of said accelerometers being defined by the radius linking said accelerometer to the center of said circle, wherein said programmed computation device is programmed and configured for determining an inclination $\Phi$ of said object relative to said frame of reference by resolution of the following matrix equation:

$$M = A \begin{bmatrix} \cos(\phi) \\ -\sin(\phi)\sin(\eta) \\ -\sin(\phi)\cos(\eta) \end{bmatrix}$$

wherein M is a vector whose $i^{th}$ component is defined by measurement $m_j$, wherein A is a matrix defined by measurement directions of said accelerometers in a frame of reference attached to said object, wherein $\eta$ is an angle of rotation of said attached frame of reference relative to said fixed frame of reference, wherein said accelerometers exhibit a Gaussian and centered measurement statistical noise, wherein said computation device is programmed to resolve said matrix equation by minimization of a criterion $L(\Phi, \eta)$ defined by the following equation:

$$L(\Phi,\eta)=(\sin(\phi)\underline{f}(\eta)-M)^T \times \underline{\Gamma^{-1}} \times (\sin(\phi)\underline{f}(\eta)-M)$$

wherein $f(\eta)$ is a vector whose $i^{th}$ component is equal to $-\sin(\alpha_i+\eta)$, wherein $\alpha_i$ is a positioning angle about an axis normal to said circle and passing through said center of an accelerometer of index i relative to one of said accelerometers taken as a reference, and wherein $\Gamma$ is a covariance matrix corresponding to measurement statistical noises of said accelerometers for said measurement directions.

* * * * *